Oct. 26, 1965 R. E. BELL ETAL 3,213,952
INDICATOR
Filed Nov. 29, 1963 6 Sheets-Sheet 1

INVENTORS.
ROBERT E. BELL
BY FREDERICK C. CARROLL
WILLIAM H. GALLO
Marshall, Wilson & Yeasting
ATTORNEYS INVENTORS.
ROBERT E. BELL
FREDERICK C. CARROLL
WILLIAM H. GALLO
BY Marshall, Wilson & Yeasting
ATTORNEYS Oct. 26, 1965 R. E. BELL ETAL 3,213,952
INDICATOR
Filed Nov. 29, 1963 6 Sheets-Sheet 4

INVENTORS.
ROBERT E. BELL
FREDERICK C. CARROLL
BY WILLIAM H. GALLO

Marshall, Wilson & Yeasting
ATTORNEYS

Oct. 26, 1965  R. E. BELL ETAL  3,213,952
INDICATOR

Filed Nov. 29, 1963  6 Sheets-Sheet 5

INVENTORS.
ROBERT E. BELL
FREDERICK C. CARROLL
WILLIAM H. GALLO
BY Marshall, Wilson & Yeasting
ATTORNEYS

United States Patent Office 3,213,952
Patented Oct. 26, 1965

3,213,952
INDICATOR
Robert E. Bell, Frederick C. Carroll, and William H. Gallo, Toledo, Ohio, assignors to Toledo Scale Corporation, Toledo, Ohio, a corporation of Ohio
Filed Nov. 29, 1963, Ser. No. 326,760
11 Claims. (Cl. 177—37)

This application is a continuation-in-part of U.S. application Ser. No. 209,902, filed July 16, 1962 in the names of Robert E. Bell, Frederick C. Carroll, and William H. Gallo and discloses some subject matter which is common to the disclosure of U.S. application Serial No. 209,860, filed July 16, 1962, in the names of Robert E. Bell, Frederick C. Carroll, and William H. Gallo.

This invention relates to new techniques and means for projecting and displaying indications from indicia-bearing charts.

The new techniques and means employ no objective or projection lenses and are particularly well suited for use in instruments such as condition responsive measuring instruments.

Prior condition responsive measuring instruments, such as weighing scales, having indications projected from indicia-bearing charts employ optical projection systems which are unsatisfactory because of their high cost and the necessity, in computing scales, to shift such projection systems along the charts to positions corresponding to desired price columns.

Prior condition responsive measuring instruments, such as weighing scales, having non-projected indications are unsatisfactory because of parallax, poor appearance, and difficulty in reading such indications.

Accordingly, the objects of this invention are to improve instrument indicating devices, to increase the precision of such devices, to simplify the construction of such devices, to improve the appearance of such devices, to provide new techniques and means for displaying projected indications, to obviate parallax in the reading of such indications, and to make easier the accurate reading of such indications.

One embodiment of this invention enabling the realization of these objects is a combination of a condition responsive indicia-bearing chart, a translucent display screen and a light source for projecting shadows of the indicia onto the screen, the shadow images being seen on the screen in the same plane as an index line.

Several index or reading lines are disclosed. In all cases, the indicia images are seen in the same plane as which ever one of the index lines is used. Alternatively, an index means having no width to conceal the indicia images is used. The index means is formed by horizontal bands of contrasting colors on the display screen (the indicia images show through the colored bands). The boundary where the two colors meet is the index line. This index line has no width to conceal the indicia images because one looks along the edge of a color band.

Several display screens also are disclosed. The screens may be provided with color bands to differentiate between zones or values. Alternatively, colored areas on the chart may be projected onto the screen to differentiate between zones or values. The screens also may be provided with indicia such as figures in price ranges or postal zones which are printed on the screens. These figures are translucent on an opaque background or they are opaque on a translucent backgorund in which cases a light diffusing material is provided on the back of the screen over the figures.

In accordance with the above, one feature of this invention resides in a projection system employing no objective or projection lenses and having a non-parallax indication provided by any one of the above index lines which is seen in the same plane as the indicia images.

Another feature resides in a projection system employing no objective or projection lenses and having a non-parallax indication provided by the above index means which has no width (boundary where two colors meet) to conceal the indicia images. This makes the first known perfect projected indication, perfect in that parallax is obviated and the indicia images are never concealed by the reading line.

Still another feature resides in providing color bands to differentiate between reading zones or values. Such zones can be postal zones on a screen used in a parcel post weighing scale and such values can be bands where one and two cent graduations are displayed on a screen used in a computing retail weighing scale. The color bands make the reading of the scale easier and with less chance for mistakes. The projection system projects the entire width of the chart at once which is seen in bands of color coded for quick recognition.

A further feature resides in providing the display screen with translucent indicia (e.g., figures in price ranges or postal zones) on an opaque background. The opaque background masks out the images of the chart indicia which are cast onto the screen around the figures printed on the screen to minimize confusion in reading the figures printed on the screen. A connected feature resides in covering such figures with a light diffusing material to keep shadows out of the figures.

A further feature resides in providing the display screen with translucent indicia (e.g., figures in price ranges or postal zones) in an opaque background. The opaque background (indicia printed in negative manner by leaving lines open in opaque background) is printed on the front of the screen and the reading line is printed on the back of the screen. In operation, the images of the chart indicia are projected onto the back of the screen where they are seen by one looking at the front of the screen in the same plane as the reading line. Since the back of the screen is closely juxtaposed to the chart, the images of the chart indicia are in sharp focus on the back of the screen, the thickness of the screen being such that the images of the chart indicia are so poorly focused at the front of the screen that the projected images do not interfere with reading the screen indicia.

Another feature resides in providing the display screen with opaque indicia (e.g., figures in price ranges or postal zones) on a translucent background with light diffusing material on the back of the screen over the figures printed on the screen. The light diffusing material prevents the images of the chart indicia which are cast onto the screen from being seen around the opaque figures printed on the translucent screen.

The above and other objects and features of this invention will be appreciated more fully from the following detailed description when read with reference to the accompanying drawings wherein.

Figure 1:
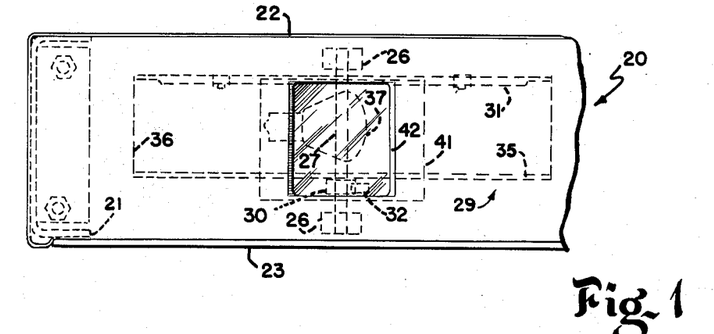
FIG. 1 is a fragmentary plan view of a weighing scale incorporating the projection system of the invention.
Figure 2:
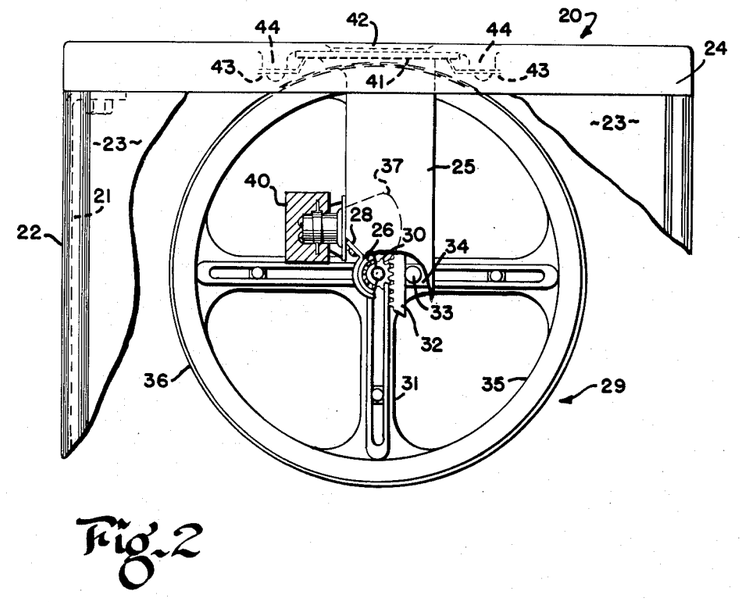
FIG. 2 is a fragmentary front elevational view of the scale shown in FIG. 1 having its housing broken away to reveal structure in the interior.

Referring to the drawings, in FIGS. 1 and 2 a projection system as contemplated in this invention is shown incorporated in an airline baggage weighing scale. The scale includes a casting 20 forming the top of the scale and supported on legs 21, only one of which is shown, a sheet metal member 22, embracing three sides of the casting 20, forming the back and sides of a housing, and a removable front cover 23. The casting 20 is provided with side skirts 23 and a pair of spaced legs 25, only one of which is shown, which support a pair of ball bearings 26 that in turn support a rotatable chart tube shaft 27 journaled in the bearings 26. Brackets 28 function to attach the bearings 26 to the legs 25.

A cylindrical weight chart 29 and a pinion 30 are fixed on the shaft 27. The pinion 30 is pinned to the shaft 27 in the same manner as a corresponding pinion is pinned to a corresponding shaft disclosed in U.S. application Serial No. 142,844 filed October 4, 1961, in the name of Frederick C. Carroll, now Patent No. 3,100,720. The chart 29 is located on the shaft 27 closely adjacent the pinion 30 and includes a spider 31 which is like and which is attached to the shaft 27 like the chart spiders disclosed in such application. The pinion 30 is meshed with a rack 32 having its lower end (not shown) operatively connected to ordinary weighing mechanism (not shown). A corresponding rack operatively connected to weighing mechanism is disclosed to the above U.S. application Serial No. 142,844. Movement of the weighing mechanism is transmitted through the rack 32 and pinion 30 to rotate the cylindrical chart 29 through equal increments of angle for equal increments of load upon the scale. Hence, the chart 29 is condition responsive. The rack 32 is kept in engagement with the pinion 30 by means of a guide roller 33 mounted for rotation on a member 34 extending from one of the casting legs 25.

The chart 29 also includes a second spider 35 in the form of a ring having the same diameter as the spider 31 and being connected to the spider 31, for concentric rotation about the axis of the shaft 27, by means of a thin indicia-bearing sheath or skin 36. The spider 35 has the form of a ring to allow lead wires (not shown) to extend into the chart 29, in an unobstructed path during rotation of the chart 29, for connection with a light source 37 having a purpose hereinafter described. The spider 35 can be made by cutting the spokes out of a spider like the spider 31.

The indicia (figures and graduations), which are opaque, are printed on the sheath or skin 36, while the sheath is flat, the indicia serving to indicate the weight of an article placed upon the scale as hereinafter described. Three of the graduations are shown enlarged in FIG. 3 in diagrammatic form as indicia 38. The printing itself is accomplished in the same manner as printing is accomplished on any ordinary cylindrical chart such as the charts shown in the above U.S. application Serial No. 142,844. The sheath or skin 36 can be made of any plastic or synthetic resin which is transparent, dimensionally stable relative to the material of the spiders with temperature changes, rigid enough when rolled in a cylinder to retain its cylindrical shape, and light enough to keep chart inertia to a practicable level. A suitable material for the sheath or skin 36 is transparent Mylar, a polyester film, having a sheet thickness of 0.005 inch. It has been found that such thickness is light enough to keep chart inertia relatively low and yet provide, when rolled into a cylinder, a rigid cylinder that retains its cylindrical shape. The Mylar sheath is rolled and cemented to the spiders 31 and 35 and has a cemented or welded seam, the ring spider 35 serving to keep the cylinder as a right cylinder. Accordingly, the cylindrical weight chart 29 is transparent and bears opaque indicia. Alternatively, the chart 29 can be opaque and the indicia transparent to obtain projected weight indications. In a broader sense, the chart and the indicia must have different degrees of transparency. For example, the chart can be transparent (colored or clear) and the indicia can be black and opaque, or the chart can be black or opaque and the indicia can be transparent (colored or clear), i.e., the chart has a first degree of transparency bearing indicia having a second degree of transparency differing from that of the chart. The transparent chart 29 is part of a shadow projection system hereinafter described for obtaining projected weight indications.

The light source 37, which is an ordinary automobile front head lamp having a filament 39 (FIG. 3), is supported in a suitable stationary holder 40 adjacent the chart shaft 27 and functions to cast shadows of the opaque chart indicia 38 onto a translucent (colored or white) display screen 41. The display screen 41 is held juxtaposed to an opening 42 in the casting 20 by means of clips 43 fixed to bosses 44 on the casting 20 and is made of glass having an emulsion coating 45 (FIG. 4) on its lower side, the shadows of the indicia being cast on the coated side of the screen. The emulsion coating makes the display screen 41 translucent and permits viewing of the images from wide angles. This is in contrast to screens made translucent by sand blasting which must be viewed squarely in order to see images clearly. However, sand-blasted screens are usable in the projection system. Any one of four reading or index lines formed by means of an opaque printed line 46 or a scratch 47 or wires 48 and 29 (FIG. 4) may be used. Line 46 is printed on the emulsion coating 45. Scratch 47 is scratched in the emulsion coating 45. Wire 48 touches the emulsion coating 45, part of its reading line being formed by the wire itself and part being formed by shadows cast by portions of the wire which do not contact the coating 45. Wire 49 does not touch the emulsion coating 45, the shadow cast by the wire forming the reading line. Wires 48 and 49 cast shadows on the coating 45 because they are between the coating and the light source 37. In all cases, the weight of an article upon the scale is indicated on the display screen 41 at which ever one of the reading lines is used. Also, in all cases the shadows or images of the chart indicia are seen by an observer looking through the opening 42 in the casting 20 in the same plane as the reading line. This plane is always the emulsion plane. That is, the shadows of the chart indicia and the reading line always appear to be in the same plane. This obviates parallax.

Figure 4:
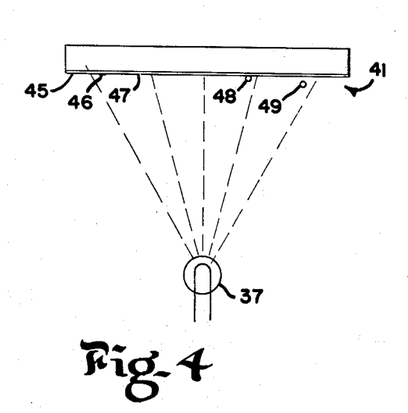
FIG. 4 is a diagram showing four index lines associated with a display screen any one of which is suitable for use in the projection system shown in FIGS. 1 and 2.
Figure 10:
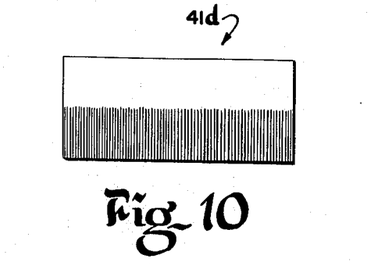
FIG. 10 is a front elevational view of a display screen having an index means suitable as a substitute for any one of the four index lines shown in FIG. 4 or FIG. 5.
Figure 11:
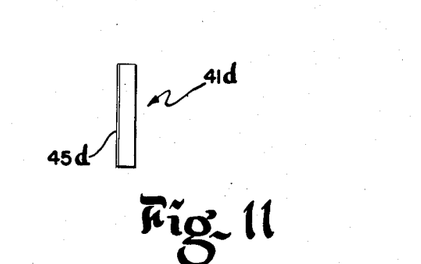
FIG. 11 is an end elevational view of the display screen shown in FIG. 10.

Alternatively, the index means shown in FIGS. 10 and 11 can be substituted for any one of the four index lines shown in FIG. 4. The display screen 41d (FIGS. 10 and 11) has an emulsion coating 45d which makes the screen translucent. The lower half of the coating 45d is colored red or pink as indicated by the color code in FIG. 10 and the upper half of the coating is clear (can be a color different from that of the lower half of the screen). The boundary where the two colors (shadow images show through the colors) meet or the line of demarcation is the index line. This index line has no width to conceal the indicia images because one looks along the edge of the red or pink portion. The index lines shown in FIG. 4 are practicable but, especially when they are enlarged by a magnifier, and, particularly in certain orientations of the chart, they can conceal projected indicia to the extent that makes rapid reading difficult. The index means shown in FIGS. 10 and 11 helps make the first known perfect projected indication, perfect in that, since the shadow images of the chart indicia and the reading line always appear to be in the same plane, parallax is obviated and, since the boundary where the two colors meet has no width, such images of the chart indicia are never concealed by the reading line.

Figure 5:
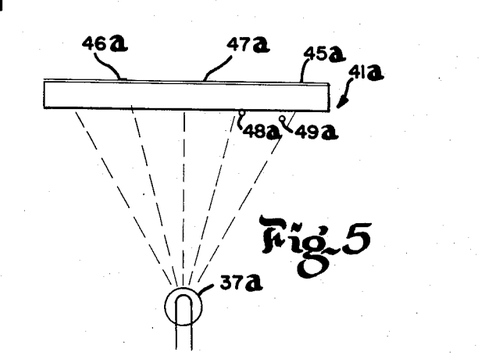
FIG. 5 is a diagram showing a modification of the display screen and the index lines illustrated in FIG. 4.

Usually it is desirable to have the emulsion coating 45 on the lower surface of the screen 41 to facilitate washing the screen through the opening 42. However, the emulsion coating may be on the upper surface of the screen as shown in FIG. 5. Reference numbers in FIG. 5 which are similar to those in FIGS. 1–4 identify parts which are alike in structure and function.

In prior weighing scales having non-projected indications, reading lines are formed by wires stretched closely adjacent the scale charts. Such wires must be very close to the charts to minimize parallax requiring very accurately made and assembled parts to prevent the charts from touching the wires when they rotate. In the present system, the display screen 41 is located relatively far from the cylindrical chart 29 so that tolerances can be relaxed and yet parallax is completely obviated.

In operation, movement of the weighing mechanism caused by change in load upon the scale rotates the condition responsive cylindrical chart 29. The weight of an article upon the scale is indicated on the display screen 41 at the index or reading line. The shadow image of the chart weight indicia and the reading line appear to be in the same plane, i.e., the plane of the emulsion coating 45.

The shadow projection system employs no optics and, therefore, has great simplicity, yet it produces sharp, brilliant indications. All prior projected indication weighing scales employ relatively complicated optical systems having projection lenses. In the present system, as illustrated in FIGS. 3, 12 and 13, the distances between the light source and the chart and between the chart and the screen, the size of the light source, and the line width of the chart indicia (figures and graduations) must be such that sharp images are obtained.

Figure 3:
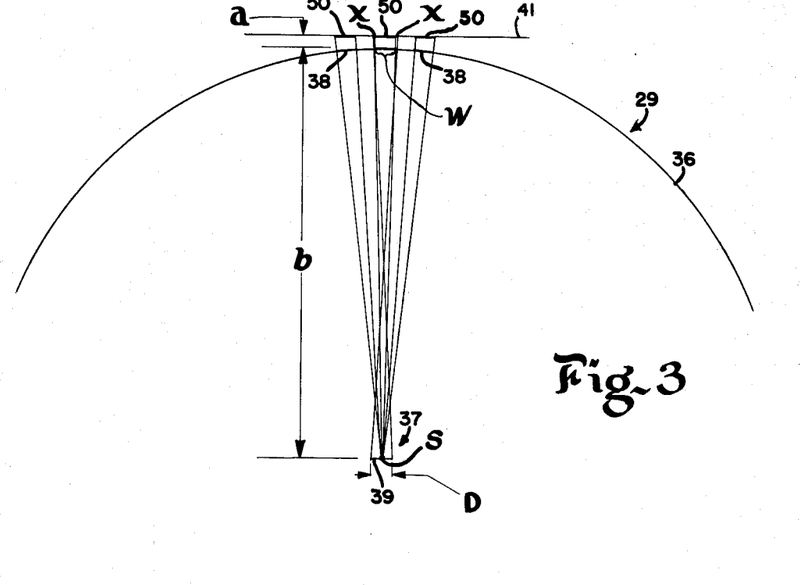
FIG. 3 is a diagram illustrating the principle of operation of the projection system shown in FIGS. 1 and 2.
Figures 12, 13:
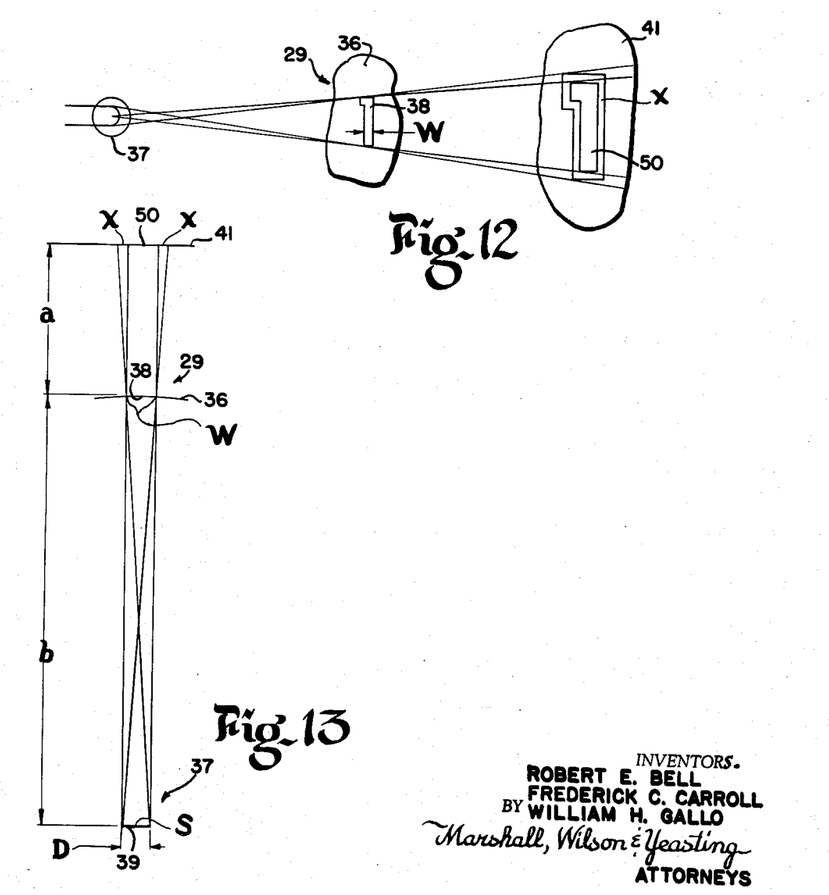
FIG. 12 is a diagram amplifying the illustration of FIG. 3 to further illustrate the principle of operation of the projection system shown in FIGS. 1 and 2.
FIG. 13 is another diagram amplifying the illustration of FIG. 3 to further illustrate the principle of operation of the projection system shown in FIGS. 1 and 2.

Referring to FIGS. 3, 12 and 13, the letter $a$ represents the distance between a line drawn tangent to the chart 29 and parallel to the display screen 41 and the bottom surface of the screen, i.e., the distance between the chart and the screen, the letter $b$ represents the distance between the light source filament 39 and such tangent line, i.e., the distance between the light source and the chart, the letter $D$ represents the length of the filament 39, the letter $S$ represents a theoretical point source, the letter $W$ represents the line width of the chart indicia, i.e., the line width of figures and graduations, and the letter $X$ represents blurred, fuzzy, gray image areas. The letter $W$ is shown applied in FIGS. 3 and 13 to the line width of a chart graduation and in FIG. 12 to the line width of a chart figure. Light from the theoretical point source $S$ causes shadows 50 of the chart indicia 38 to be cast on the display screen 41. When the filament 39 is substituted for the point source $S$, light from the filament causes the same shadows 50 to be cast on the display screen, since the filament contains a point source. In addition, light rays directed from the ends of the filament add increments $X$ around the shadow images 50. These increments $X$ are partial shadows and are blurred, fuzzy, gray areas. However, these blurred, fuzzy areas are so tiny in the arrangement shown in FIG. 3, for example, that they are insignificant, the images 50 being sharp and brilliant. The length $a$ shown in FIG. 3 is so small that no magnification of the chart indicia is seen by the eye.

The ratio of $b$ to $a$ depends on the line width $W$ of chart figures and graduations 38 which make up the projected figures and graduations 50. The ratio of $b$ to $a$ shown in FIG. 3 has been found to produce good images. Such ratio shown in FIGS. 12 and 13 has been made smaller to more clearly illustrate the gray zone $X$ in FIG. 12 and the similar triangles formed by the light beams in FIG. 13. From FIG. 13

$$\frac{a}{b} = \frac{X \text{ (base of triangle)}}{D \text{ (base of triangle)}}$$

or $$X = \frac{aD}{b}$$

and let $W/X$ = image quality factor.

Although $W/X$ may have any moderately large value and still produce a readable image, for good quality it should have a value as large as possible. For example, a good image is produced when $$\frac{W}{X} = 4 \text{ or } W = 4X$$

then $$\frac{b}{a} = \frac{4D}{W}$$

Increasing $W/X$ from such value of 4 improves image sharpness. It can be seen in FIG. 3 as the length of the filament is lengthened from S to D, that the blurred, fuzzy areas $X$ increase. Hence, decreasing D improves image quality. Also, it can be seen that if the filament 39 were moved toward the chart 29 to reduce the size of the ratio of $b$ to $a$ that the size of the blurred, fuzzy areas $X$ would increase. Hence, increasing the ratio of $b$ to $a$ improves image quality.

Figures 6, 7, 8:
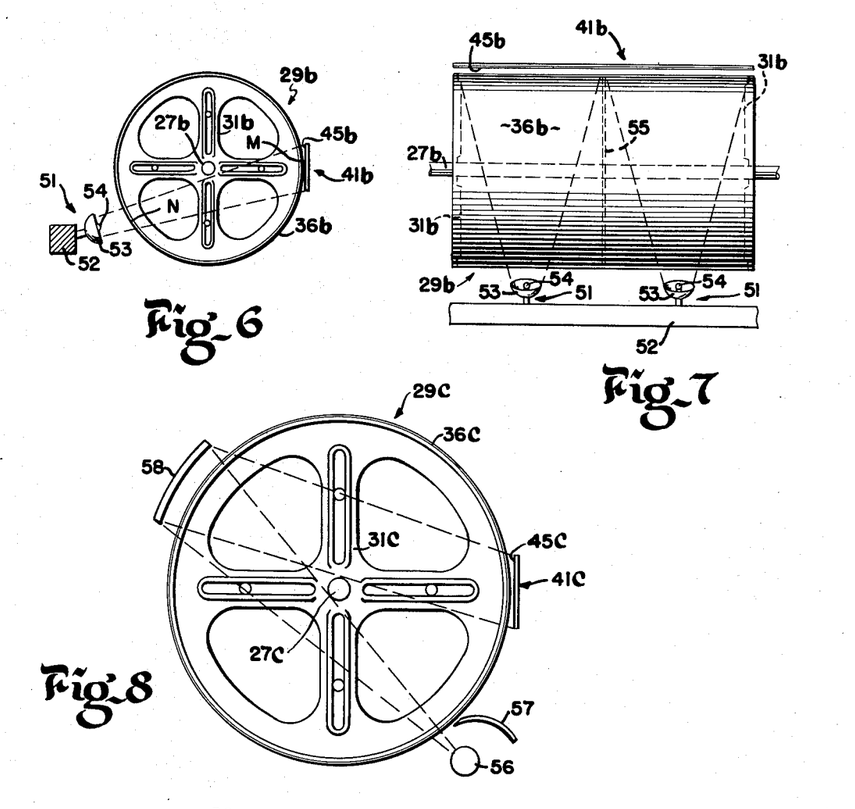
FIG. 6 is a view similar to FIG. 2 showing a modification of the projection system.
FIG. 7 is a plan view of the device shown in FIG. 6.
FIG. 8 is a view similar to FIG. 2 showing another modification of the projection system.

A modification of the projection system is shown in FIGS. 6 and 7. The chart 29 shown in FIGS. 1–3 is a cylindrical weight chart incorporated in an airline baggage scale. A chart 29b shown in FIGS. 6 and 7 is a cylindrical computing scale chart incorporated in a retail scale, the chart 29b having columns of weight and value indicia. Reference numbers in FIGS. 6 and 7 which are similar to those in FIGS. 1–5 identify parts which are alike in structure and function. Because of the relatively great length of the chart 29b, its indicia-bearing skin or sheath 36b is supported at each of its ends by a spoked spider 31b instead of being supported at one end by a spoked spider 31b and at its other end by a spider in the form of a ring, like the spider 35, as is the chart 29 (FIGS. 1–3). In operation, movement of the weighing mechanism caused by change in load upon the scale rotates the condition responsive cylindrical chart 29b. The weight of an article upon the scale is indicated on the display screen 41b at the index or reading line and the computed value of such article also is indicated on the display screen at the index or reading line, the particular column of value indicia being selected in accordance with a selected unit price in a price range which is printed on a coated side 45b of the display screen 41b. This is the usual operation of a computing weighing scale of the type used in retail food stores. The indicia on the chart 29b are very small. Hence, a magnifying lens (not shown) is provided in juxtaposition with the display screen 41b.

Because one or the other of the spoked spiders 31b would contact any leads connected to a light source located inside the cylindrical chart 29b during rotation of the chart, light sources 51 are located outside the chart 29b and are supported on a stationary member 52 as shown in FIGS. 6 and 7. Two light sources 51 are used because of the relatively great length of the cylindrical chart 29b. Each of the light sources 51 includes a parabolic reflector 53 of the type found in flashlights and a bulb 54 which is so located relative to the focal point of the reflector that the light rays diverge as shown in FIGS. 6 and 7. An opaque disc baffle 55 carried by the shaft 27b prevents light rays from one source from becoming mixed with light rays from the other source. Mixing of such lights rays would cause a double image to be seen on the display screen 41b. The parabolic reflectors tend to improve image quality since they partially collimate the light. Collimated light produces an optical effect equivalent to a point source located at an infinite distance from the screen.

In addition to the above feature of employing no objective or projection lenses, one of the principal features of the projection system resides in a projection system which provides a wide field of view. In prior computing retail projected indication scales, the projection systems must be moved along the charts to selected unit prices in the price ranges, the projection systems then producing projected indications of the value figures within their narrow fields of view that correspond to the selected prices. In sharp contrast, the projection system shown in FIGS. 1–7 projects the entire width of the charts at once. This has never been done before. That is, the present system without objective or projection lenses accomplishes something that prior systems even with objective or projection lenses cannot do. With reference to FIG. 7, the entire width of the chart 29b is projected onto the display screen 41b at once. Images of computed values appear on the entire width of the display screen 41b at once. The scale operator needs only to run his eye along the price range to the particular unit price of the article being weighed and then observe the value figure at the reading line which corresponds to the selected price.

In addition to the features described above, the projection system shown in FIGS. 6 and 7 features the unique projection of light through the chart twice, yet only the shadows of those indicia which are located in chart area M adjacent the display screen 41b can be seen on the display screen. This is because of the size of the ratios b/a (defined above—see FIG. 3). The shadow images from chart area N (FIG. 6) are lost because instead of having the display screen 41b close to chart area N, as the display screen 41 is close to the chart 29 (FIGS. 1–3), and instead of having the source 51 far from chart area N, as the source 37 is far from the chart 29 (FIGS. 1–3), just the opposite is true. That is, instead of having a ratio of b/a relatively large as shown in FIG. 3, the ratio of b/a in the arrangement shown in FIGS. 6 and 7 in connection with chart area N is relatively small to produce such large blurred, fuzzy, gray image areas that the shadow images from chart area N cannot be observed on the display screen 41b and are, accordingly, lost. See the blurred, fuzzy, gray image areas X in FIGS. 3, 12 and 13. Hence, the light sources 51 direct light rays through the chart area N toward the display screen 41b without casting any shadow images from the chart area N onto the screen which are apparent to the eye. However, the ratio of b/a in connection with chart area M is another matter. Just as the ratio of b/a is relatively large as shown in FIG. 3, the ratio of b/a is relatively large as shown in FIG. 6 in connection with chart area M. In fact, the ratio of b/a shown in FIG. 6 in connection with chart area M is very large—the ideal arrangement. Accordingly, the light sources 51 direct light rays through the chart areas N and M onto the display screen 41b causing brilliant, sharp shadow images of the indicia in the chart area M to be projected onto the display screen.

Figure 9:
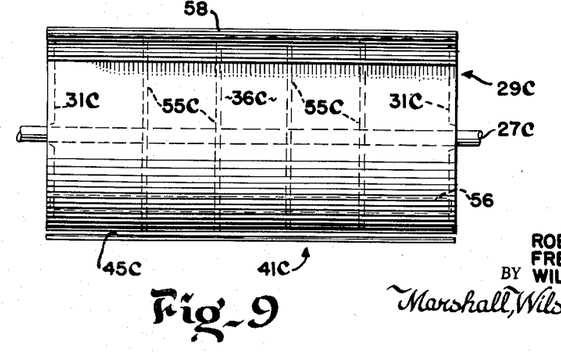
FIG. 9 is a plan view of the device shown in FIG. 8.

Another modification of the projection system is shown in FIGS. 8 and 9. A chart 29c is a cylindrical computing scale chart like the chart 29b (FIGS. 6 and 7). The system shown in FIGS. 8 and 9 is useful in modifying existing scales which already are provided with a light source 56 in the form of a fluorescent tube having a length about equal to the width of the cylindrical chart 29c. Reference numbers in FIGS. 8 and 9 which are similar to those in FIGS. 1–7 identify parts which are alike in structure and function.

Light from the light source 56, which cannot reach the display screen 41c directly because of a stationary shield 57, is directed twice through the chart 29c, as shown in FIG. 8 onto a stationarily mounted curved mirror 58 having a length about equal to that of the tube light source 56. The mirror 58, which could be flat if the light source were bright enough, is curved to suit the point where the light beams are to be focused and reflects the light as indicated by the broken lines in FIG. 8 through the chart 29c twice just as the light beams from the light sources 51 (FIGS. 6 and 7) pass through the chart 29b twice. That is, the systems shown in FIGS. 6 and 7, and FIGS. 8 and 9 are comparable, the mirror 58 taking the place of the light source 51. As described in connection with FIGS. 6 and 7, shadow images from the chart area adjacent the mirror 58 are lost and brilliant, sharp images of the chart indicia positioned adjacent the display screen 41c appear on such screen. Instead of having a single opaque disc baffle carried by the chart shaft as shown in FIG. 7, the system shown in FIGS. 8 and 9 is provided with four baffles 55c which help prevent the appearances of shadow images on the display screen 41c.

Figure 14:
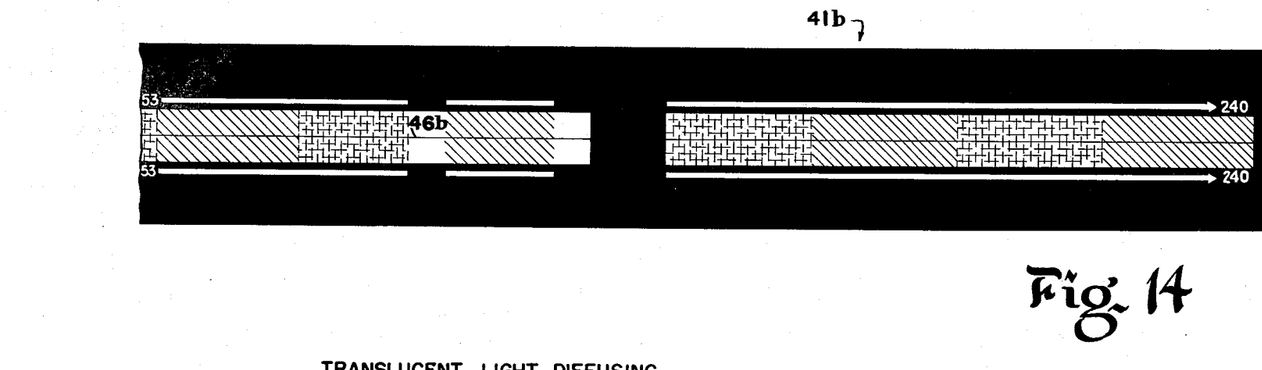
FIG. 14 is a fragmentary, front elevational view of a display screen suitable for use in the weighing scales shown in FIGS. 6–9.

FIG. 14 shows a display screen 41b which is particularly well suited for use in the retail computing scales shown in FIGS. 6–9. Reference numbers in FIG. 14 which are similar to those in FIGS. 1–13 identify parts which are alike in structure and in function. As described in connection with FIGS. 6 and 7, the weight of an article upon the scale is indicated on the display screen 41b at the index or reading line and the computed value of such article also is indicated on the display screen at the index or reading line, the particular column of value indicia being selected in accordance with a selected unit price in a price range which is printed on the coated side 45b of the display screen 41b. This is the usual operation of a computing scale of the type used in retail food stores. The indicia on the chart 29b are very small. Hence, a magnifying lens or lenses (not shown) are provided in juxtaposition with the display screen 41b.

The cylindrical computing charts in general use in retail scales are of two types because there is not enough room on a single chart for all of the values that correspond to the wide range of unit prices used in retail trade. Accordingly, it is usual to use a produce chart having columns of value indicia that correspond to a price range of from about 3 cents to 40 cents and another chart, used, for example, in connection with weighing meat, having columns of value indicia that correspond to a price range of from about $0.25 to $2.40. A cylindrical magnifying lens (not shown) is used with the produce chart to enlarge the projected indications of the invention in a vertical direction. A conventional duplex magnifying lens (not shown) is used with the other chart ($0.25 to $2.40 range) to enlarge the projected indications of the invention both in the vertical and horizontal directions. Although in each case the entire width of the chart is projected at once, when the duplex lens is used, only one-half of the projected chart is viewed at a time.

The display screen 41b (FIG. 14) is used with the duplex magnifying lens. The screen has a price range printed in translucent figures running from $0.25 to $2.40 on a black opaque background. The figures are in groups which are differentiated by the yellow and green color bands that are indicated by the color codes in FIG. 14. Reading from the left, the price figures start at 25 and proceed in increments to 53 in the first yellow-band—the 53 figure is shown in FIG. 14, the next band (green) has figures from 120 to 140, the next band (yellow) has figures from 55 to 70, the next band (green) has figures from 143 to 159, the next band (yellow) has figures from 73 to 95, the next band (green) has figures from 160 to 180, the next band (yellow) has figures from 99 to 119, and the last band (green) has figures from 185 to 240. The 240 figure is shown in FIG. 14. These translucent price figures are printed in identical sets above and below the reading window across which runs the index line 46b and are represented in FIG. 14 by the two horizontal arrows which run above and below the reading window from the figures 53 to the figures 240. The two uncolored portions of the reading window are used to display weight figures. In operation, the duplex lens is selectively located in the usual way in one of its two positions. In one position all of the yellow bands appear to the eye as one continuous strip producing a price range from $0.25 to $1.19 with the weight indication showing in one of the uncolored screen positions. In the other position of the duplex lens, the green bands appear to the eye as one continuous strip producing a price range from $1.20 to $2.40 with the weight indication showing in the other one of the uncolored screen portions. The duplex lens is a conventional device for in effect doubling the size of the cylindrical chart without actually increasing its physical size. In each case, the entire width of the chart is projected at once, but only one-half is viewed at a time.

The value figures on the cylindrical chart are printed in columns, there being a column for each price figure printed on the screen 41b, with graduation lines evenly dividing the spaces between figures. For example, the figures in one column run 795, 800, 805, etc., with graduation lines between the figures representing the values 796, 797, etc. That is, these are one cent graduations. The figures in another column run 1770, 1780, 1790, etc., with graduation lines between the figures representing the values 1772, 1774, etc. That is, these are two cent graduations. It is necessary to have both one and two cent graduations in order to get all of the needed value indicia on the cylindrical chart. The one cent graduations appear on the display screen 41b all in the yellow bands and the two cent graduations appear on the display screen 41b all in the green bands. The screen 41b is provided with translucent printing (not shown) which indicates that the yellow bands contain one cent graduations and the green bands contain two cent graduations. The projection system projects the entire width of the cylindrical chart at once which is seen in bands of color coded for quick recognition. The color bands make the reading of the scale easier and with less chance for mistakes. One of the features resides in providing color bands to differentiate between zones or values. Such zones can be, for example, postal zones on a screen used in a parcel post weighing scale and such values can be, for example, the one and two cent graduation bands shown in FIG. 14. Alternatively, the color bands are printed on the cylindrical chart so that bands of color are projected onto the display screen. In either case the end effect is the same, i.e., the entire width of the cylindrical chart is projected at once which is seen in bands of color coded for quick recognition. In operation, the weight of an article upon the weighing scale is seen at the index line 46b in one of the uncolored windows and the computed value of such article is seen at the index line 46b in a position aligned vertically with the selected unit price in the price range which is represented by the horizontal arrows in FIG. 14.

In making the display screen 41b, the back of the glass first is covered with a gray emulsion coating to make the screen translucent (can be any color). The reference numbers 45, 45a, 45b, 45c and 45d refer to translucent emulsion coatings. As described above, the glass screen can be made translucent by sand blasting. Then, the black opaque border around the reading window shown in FIG. 14 and the reading line 46b are applied by means of black ink. The price figures represented by the horizontal arrows in FIG. 14 are printed along with the application of the black ink by leaving open lines in the black ink. The gray translucent coating shows through such open places in the black ink, whereby the price figures are translucent on the black opaque background. Then the strips of green and yellow are applied by means of very transparent ink. These colored strips are indicated by the color codes in FIG. 14. Two places are left uncolored as shown in FIG. 14 for the display of weight indicia shadow images. The green and yellow inks color strips in the reading window and also color the translucent price figures represented by the horizontal arrows. Finally, a transparent ink is applied to the backs of the price figures forming a translucent coating over such figures. One of the features of the projecting and displaying devices of the invention resides in projecting the shadow images of the chart indicia onto the display screen 41b without causing the reading of the price figures to be interfered with. The black opaque border around the translucent colored price figures printed on the display screen 41b masks out the images of the chart indicia which are cast onto the screen around the price figures. The translucent coating on the backs of such price figures, by diffusion of light, prevents images of the chart indicia which are projected onto the screen from being superimposed on the price figures printed on the screen, i.e., such coating keeps shadows out of the price figures printed on the screen. Hence, the shadow images are seen on the screen in the reading windows only and the price figures printed on the screen are clearly legible at all times.

Figure 15:
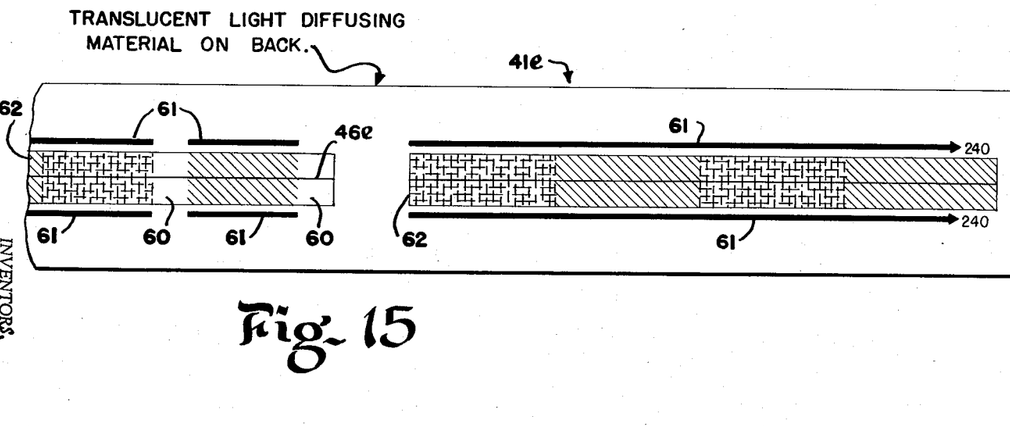
FIG. 15 is a fragmentary, front elevational view of a modified display screen suitable as a substitute for the display screen illustrated in FIG. 14.

FIG. 15 shows a modified display screen 41e suitable as a substitute for the display screen 41b illustrated in FIG. 14. Reference numbers in FIG. 15 which are similar to those in FIGS. 1–14 identify parts which are alike in structure and in function.

In making the display screen 41e, the back of the glass is made translucent in the same way that the screen 41b is made translucent (emulsion coating). The price figures 61 are then printed in black opaque ink along with a reading line 46e. White ink then is applied to the back of the screen over everything except the reading windows which are outlined in black ink. This provides a translucent light diffusing material on the back of the screen as indicated in FIG. 15. This white ink is more opaque than the translucent emulsion coating over the reading windows to give contrast and to keep out shadows. Finally, strips 62 of green and yellow are applied by means of very transparent ink to differentiate between one and two cent graduations. Two places 60 are left uncolored for the display of weight indicia shadow images.

One of the features of the projecting and displaying devices of the invention resides in projecting the shadow images of the chart indicia onto the display screen 41e without causing the reading of the price figures 61 to be interfered with. The white ink coating over all of the back of the screen except the reading windows and on top of the opaque price figures 61 prevents the images of the chart indicia which are cast onto the screen 41e from being seen around the opaque price figures 61 printed on the screen. Hence, the shadow images are seen on the screen in the reading windows only and the price figures 61 are clearly legible at all times.

Figure 16:
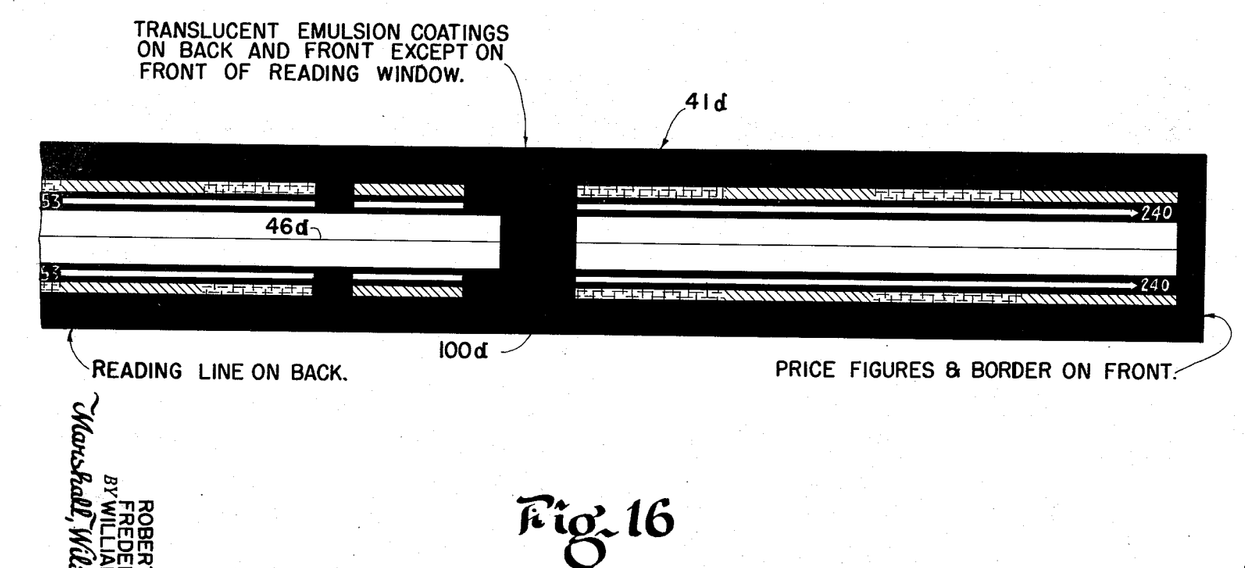
FIG. 16 is a fragmentary, front elevational view of a modified display screen suitable as a substitute for the display screen illustrated in FIG. 14.

FIG. 16 shows a modified display screen 41d suitable as a substitute for the display screen 41b illustrated in FIG. 14. Reference numbers in FIG. 16 which are similar to those in FIGS. 1–15 identify parts which are alike in structure and in function.

In making the display screen 41d, the back of the glass is made translucent in the same way that the screen 41b is made translucent (emulsion coating). The reading line 46d and a black vertical strip 100d running from the top of the screen to the bottom (prevents chart figures which are used for direct viewing in back indication from being projected) then are printed in black opaque ink on the back of the screen. Nothing else goes on the back of the screen. The same translucent emulsion coating is applied to the front of the screen except over the reading window. Then, the rectangularly shaped colored strips shown in FIG. 16 are applied to the front of the screen by means of transparent ink to differentiate between one and two cent graduations. Finally, in one printing operation, the black ink opaque border is applied to the front of the screen which defines the reading window and also the outer edges of the colored strips and black positive figures are printed in the colored strips ("one cent graduations" or "two cent graduations") to point out the one and two cent price graduations, the price figures being printed (represented by white arrows) in a negative fashion by leaving open lines in the opaque border. The price figures are translucent in the black opaque background.

One of the features of the projecting and displaying devices of the invention resides in projecting the images of the chart indicia onto the display screen 41d without causing the reading of the price figures to be interfered with. The black opaque border around the translucent price figures masks out any images of the chart indicia which may be cast around the price figures. Such images do not intermingle with the price figures because it has been discovered that if the screen is thick enough (for example, ⅛ inch) the projected images are so out of focus by the time that they reach the price figures printed on the front of the screen that they are invisible in the price figures. The reason for this is the back of the screen is so close to the chart that the projected images are in very sharp focus on the back of the screen (projected images are seen in the same plane as the reading line 46d which is printed on the back of the screen). However, since the price figures which are printed on the front of the screen are separated from the sharply focused shadow images by the thickness of the screen (1/16 inch thickness is not satisfactory but ⅛ inch thickness is satisfactory), the shadow images cannot be seen in the price figures. The above translucent emulsion coating which is applied to the front of the screen further ensures, by diffusion, that no shadow images are visible in the price figures. This emulsion coating also functions as a base base on which to print, it being difficult to print on bare glass. The principal feature of this arrangement resides in focusing the shadow images on the back of the screen and printing the price figures on the front of the screen and having a screen thickness such that focused shadow images cannot be seen in the price figures.

In operation, the operator looks through the window and sees sharp, brilliant value images and the reading line in the same plane (parallax is obviated). The operator also sees bright, clear price figures which have no shadow images in or around them and this holds true whether the chart is in motion or at rest. He first selects the value column to be read by finding the price per pound associated with the article being weighed and then moves his eye along the column to the reading line where he reads the computed value of such article.

It is to be understood that the above description is illustrative of this invention and that various modifications thereof can be utilized without departing from its spirit and scope.

Having described the invention, we claim:

1. An instrument comprising, in combination, an indicia-bearing chart, a translucent display screen having a first surface adjacent the chart and a second indicia-bearing surface separated by the thickness of the screen from the first surface, and means for projecting images of the chart indicia onto the first screen surface in sharp focus, certain chart indicia corresponding to certain screen indicia and the thickness of the screen being such as to preclude sharp focus of the projected images at the second screen surface.

2. An instrument comprising, in combination, an indicia-bearing chart, a translucent display screen having a first surface adjacent the chart and a second surface separated by the thickness of the screen from the first surface, means for projecting shadow images of the chart indicia onto the first screen surface, an opaque border on the second screen surface defining a reading window, index means for the images, and screen indicia, certain of which correspond to certain chart indicia, on the second screen surface in the opaque border and extending along the reading window.

3. An instrument according to claim 2 wherein the shadow images are in sharp focus on the first screen surface and said thickness of the screen is such as to preclude sharp focus of the shadow images at the second screen surface.

4. An instrument comprising, in combination, an indicia-bearing chart, a display screen having a first surface adjacent the chart and covered with a first coating to make the screen translucent and having a second surface separated by the thickness of the screen from the first surface, means for projecting images of the chart indicia onto the first screen surface, an opaque border at the second screen surface defining a reading window, a second coating, which is like said first coating, on the second screen surface beneath the opaque border, and screen indicia, serving as means to select the projected images to be read, on the second coating and extending along the reading window.

5. A weighing scale comprising, in combination, a condition responsive indicia-bearing chart, a translucent display screen having a first surface adjacent the chart and a second surface separated by the thickness of the screen from the first surface, means for projecting shadow images of the chart indicia onto the first screen surface, an opaque border at the second screen surface defining a reading window, a translucent coating on the second screen surface beneath the opaque border, and screen indicia, serving as means to select the shadow images to be read, on the translucent coating and extending along the reading window, whereby sharp, brilliant shadow images and sharp, brilliant screen indicia are seen by looking at the reading window.

6. A weighing scale comprising, in combination, a condition responsive indicia-bearing chart, a translucent display screen having a first surface adjacent the chart and a second surface separated by the thickness of the screen from the first surface, means for projecting sharply focused shadow images of the chart indicia onto the first screen surface, an opaque border at the second screen surface defining a reading window, a translucent coating on the second screen surface beneath the opaque border, index means for the images, and screen indicia, serving as means to select preliminarily the shadow images to be read, on the translucent coating and extending along the reading window, the index means serving to point out one of said preliminarily selected shadow images to be read.

7. An instrument comprising, in combination, an indicia-bearing chart, a display screen having a translucent reading window, means for projecting images of the chart indicia onto one side of the screen, and screen indicia on the other side of the screen extending along the reading window and serving to select the images to be read.

8. An instrument comprising, in combination, an indicia-bearing chart, a display screen having on one side an opaque border around a translucent reading window with translucent indicia in the opaque border, certain chart indicia corresponding to certain screen indicia, and means for projecting images of the chart indicia onto the other side of the screen, the projected images being projected in the reading window in columns vertically aligned with the screen indicia.

9. An instrument comprising, in combination, an indicia-bearing chart, a display screen having an opaque border around a translucent reading window with translucent indicia in the opaque border, certain chart indicia corresponding to certain screen indicia, and means for projecting images of the indicia on the chart onto the screen, the projected images being projected in the reading window in alignment with the screen indicia and the opaque border functioning to mask out projected images of chart indicia around the screen indicia.

10. An instrument according to claim 9 wherein light diffusing material covers the backs of the screen indicia to keep shadows out of the screen indicia.

11. An instrument comprising, in combination, an indicia-bearing chart, a display screen having a translucent border around a translucent reading window with opaque indicia in the translucent border, certain chart indicia corresponding to certain screen indicia, a light diffusing material covering the border over the backs of the screen indicia, and means for projecting images of the indicia on the chart onto the screen, the projected images being projected in the reading window in alignment with the screen indicia and the light diffusing material functioning to prevent the projected images from being seen around the screen indicia.

References Cited by the Examiner
UNITED STATES PATENTS 3,100,720   8/63   Carroll _______________ 177—37

LEYLAND M. MARTIN, *Primary Examiner.*

LEO SMILOW, *Examiner.*